United States Patent
Lee et al.

(10) Patent No.: US 7,996,451 B2
(45) Date of Patent: Aug. 9, 2011

(54) SYSTEM, METHOD, AND MULTI-LEVEL OBJECT DATA STRUCTURE THEREOF FOR BROWSING MULTIMEDIA DATA

(75) Inventors: Jin Soo Lee, Seoul (KR); Hyeon Jun Kim, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 87 days.

(21) Appl. No.: 12/426,819

(22) Filed: Apr. 20, 2009

(65) Prior Publication Data

US 2009/0234890 A1    Sep. 17, 2009

Related U.S. Application Data

(63) Continuation of application No. 11/192,731, filed on Jul. 29, 2005, now Pat. No. 7,523,134, which is a continuation of application No. 09/594,808, filed on Jun. 16, 2000, now abandoned.

(51) Int. Cl.
*G06F 17/00* (2006.01)
(52) U.S. Cl. .............. 707/913; 707/914; 707/916
(58) Field of Classification Search ........... 707/913, 707/914, 916
See application file for complete search history.

(56) References Cited

U.S. PATENT DOCUMENTS

| | | | | |
|---|---|---|---|---|
| 5,493,677 A | * | 2/1996 | Balogh et al. | 382/305 |
| 5,655,117 A | | 8/1997 | Goldberg et al. | |
| 5,684,999 A | * | 11/1997 | Okamoto | 704/9 |
| 5,708,767 A | | 1/1998 | Yeo et al. | |
| 5,710,918 A | | 1/1998 | Lagarde et al. | |
| 5,878,277 A | | 3/1999 | Ohta | |
| 6,144,375 A | * | 11/2000 | Jain et al. | 715/251 |
| 6,298,482 B1 | | 10/2001 | Seidman et al. | |
| 6,356,902 B1 | | 3/2002 | Tan et al. | |
| 6,388,688 B1 | | 5/2002 | Schileru-Key | |

* cited by examiner

*Primary Examiner* — Sana Al-Hashemi
(74) *Attorney, Agent, or Firm* — Sidley Austin LLP

(57) ABSTRACT

System, method, and multi-level object data structure thereof for browsing a multi-media data, the method for browsing a multimedia data using a multilevel object data structure including the steps of (1) receiving multimedia information and multiple supplementary information on each object in the multimedia information on the same time, (2) separating the multimedia information and the multiple supplementary information, (3) displaying the multimedia information, and (4) browsing/searching supplementary information related to a particular object from the multiple supplementary information, and displaying the supplementary information when a user requests for browsing/searching the supplementary information related to the particular object.

14 Claims, 7 Drawing Sheets

SYSTEM, METHOD, AND MULTI-LEVEL OBJECT DATA STRUCTURE THEREOF FOR BROWSING MULTIMEDIA DATA

CROSS-REFERENCE TO RELATED APPLICATION AND CLAIM OF PRIORITY

The present application is a continuation of co-pending U.S. patent application Ser. No. 11/192,731, filed Jul. 29, 2005, entitled "System, Method, and Multi-Level Object Data Structure Thereof for Browsing Multimedia," which is a continuation of U.S. patent application Ser. No. 09/594,808, filed on Jun. 16, 2000, entitled "System, Method, and Multi-Level Object Data Structure Thereof for Browsing Multimedia," which claims priority to and the benefit of Korean Patent Application 26763/1999, filed on Jul. 3, 1999, entitled "System, Method, and Multi-Level Object Data Structure Thereof for Browsing Multimedia," which is assigned to the present assignee and is incorporated in its entirety herein by reference.

BACKGROUND

1. Field of Invention

The present invention relates to a browsing of multi-media data, such as a moving picture, and more particularly, to system, method, and multi-level object data structure thereof for browsing a multi-media data, which permits to browse detailed supplementary information on each object included in the multi-media data in displaying the multi-media data on request from a user.

2. Background of the Related Art

Recently, as searching techniques for digital moving pictures are developed, there have been active suggestions on browsing or searching contents based moving picture. As typical examples, there are browsing by using a key frame disclosed in the U.S. Pat. No. 5,708,767, or an object based browsing method disclosed in the U.S. Pat. No. 5,655,117. In the browsing by using a key frame, a few typical important scenes/key frames are suggested, and reproduced in an entire moving picture, to search the moving picture. However, since this method is conducted merely relying on the key frames, it is difficult to expect a search according to actual development of contents of the moving picture. On the other hand, in the object based moving picture searching, the moving picture is depicted and searched with reference to entrance and exit of difference objects, such as characters, in the moving picture. However, most of the objects defined in the object based moving picture searching is foreground objects, of which structures are not appropriate for expressing place information which is background objects. Therefore, the background information, such as a place, can not be used in the related art, because, though a portion a specific object enters on the picture may be defined as an actual entry section in the case of foreground objects, the place is defined as one entry section since the place is the same as far as one scene is continued even if a camera angle is changed. Therefore, the place has implication different from a simple entry section in other foreground object as an implication that the places are the same is reflected to an object entry section even if appearances of an object on the picture are different. And, even though a foreground information with a motion is information only on movement of the object, place information with a motion implies a movement of the camera. Such place information becomes more useful when the place information is managed as a separate object. However, the watcher may want supplementary information on an actual place, i.e., where is the place the picture is taken, or other supplementary information on the actual place. For example, though a café where the heroine drops in is place information of the moving picture contents, the watcher may want supplementary information, such as the place the café actually is, or an introduction on an address or place (or a sketch map). Or the watcher may want detailed supplementary information on a particular object in the moving picture in view of contents of the moving picture, or actual supplementary information (for example, name, brief profile, and information on a home page, an address, or fan club, for fans). However, the related art method has a problem in that a searching or browsing method which can meet the aforementioned users wants can not be provided.

SUMMARY OF THE INVENTION

Accordingly, the present invention is directed to system, method, and multi-level object data structure thereof for browsing a multi-media data that substantially obviates one or more of the problems due to limitations and disadvantages of the related art.

An object of the present invention is to provide system, and method for browsing a multi-media data, which permits to browse or search for supplementary information on a particular object included in a moving picture based on three elements of object, event, and background during the watcher watches the moving picture.

Other object of the present invention is to provide a multi-level object data structure for implementing the system, and method for browsing a multi-media data of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for browsing a multimedia data using a multilevel object data structure, including the steps of (1) receiving multimedia information and multiple supplementary information on each object in the multimedia information on the same time, (2) separating the multimedia information and the multiple supplementary information, (3) displaying the multimedia information, and (4) browsing/searching supplementary information related to a particular object from the multiple supplementary information, and displaying the supplementary information when a user requests for browsing/searching the supplementary information related to the particular object.

The object related supplementary information includes content information on a particular program in the multimedia information, and multiple supplementary information including real information.

The content information and the real information includes selective combinations of information which represents relations of object information, event information, place information, and object/event/place information in a graph.

The content information and the real information includes text information describing character of the object, and image or graphic information on the character.

The object information includes text information having information describing the object, and image information on the object information.

The event information includes text information describing contents of the event, and information on a place or a sketch map the event occurred.

The place information includes text information describing the place, and information on location or a sketch map of the place.

In other aspect of the present invention, there is provided a multi-level object data structure in a system for displaying multimedia information, wherein supplementary information on each object included in the multimedia information has multiple supplementary information structure including at least content information and real information on a particular program.

In another aspect of the present invention, there is provided a multi-level object data structure wherein contents of a moving picture is expressed in a graph of object and place relation and an array of related events are made for each relation for making relation, and, for providing a function for displaying a required section, the moving picture is expressed in an object structure for providing information on objects, a place structure for providing information on a place which is a background of an event, an event structure for providing information required for describing a particular unit event in the moving picture, and relations of the structures in a graph, for searching the moving picture by using a double structure of content information and real information on at least one relation for each of the relations or a selected element, in the moving picture.

The object structure, the place structure, and the event structure, expressed as content information and real information of the moving picture, are expressed in text information describing at least object name, place name, and event.

The content information on the moving picture is information on a place or an object having a meaning in view of content of the moving picture, and the real information is information on a real place which is meaningful place in view of the content of the moving picture, or on actual performer cast an object in the moving picture.

In further aspect of the present invention, there is provided a system for browsing a moving picture by using a multi-level object data structure including means for supplying moving picture digital information including a multiple object information structure having content based meaningful object information of the moving picture and real object information of the object, means for receiving the digital information and separating and reading the multiple object information and the moving picture information, and means for presenting real object information the multiple object information describes in response to a users request.

The multiple object information structure has multiple object information structures for the object, the place, and the event, and the means for presenting real object information presents real information on an object cast in the moving picture or real place information on the place which is a background of an event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
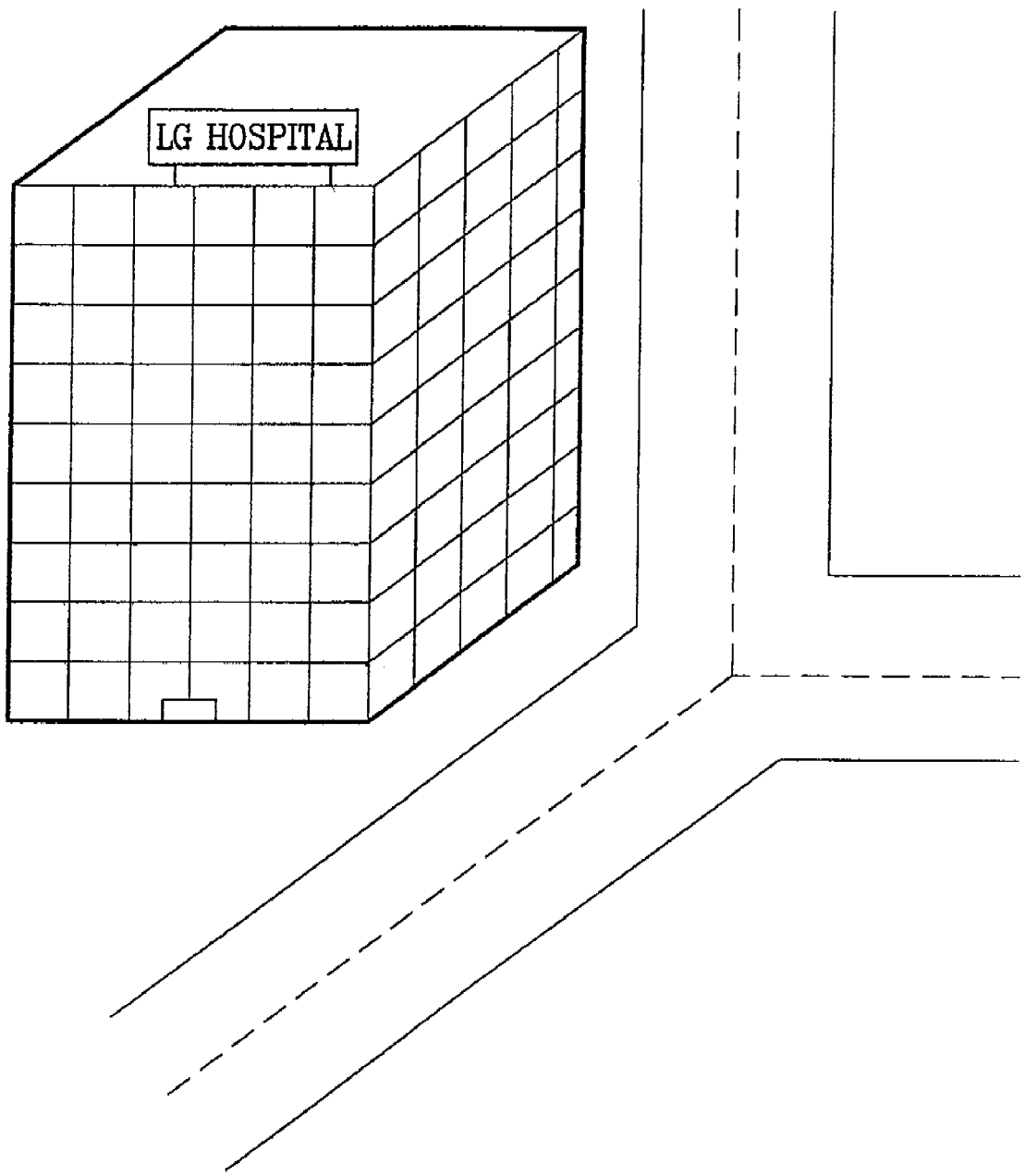
FIG. 1 illustrates one frame of a moving picture for explaining the present invention.
Figure 2:
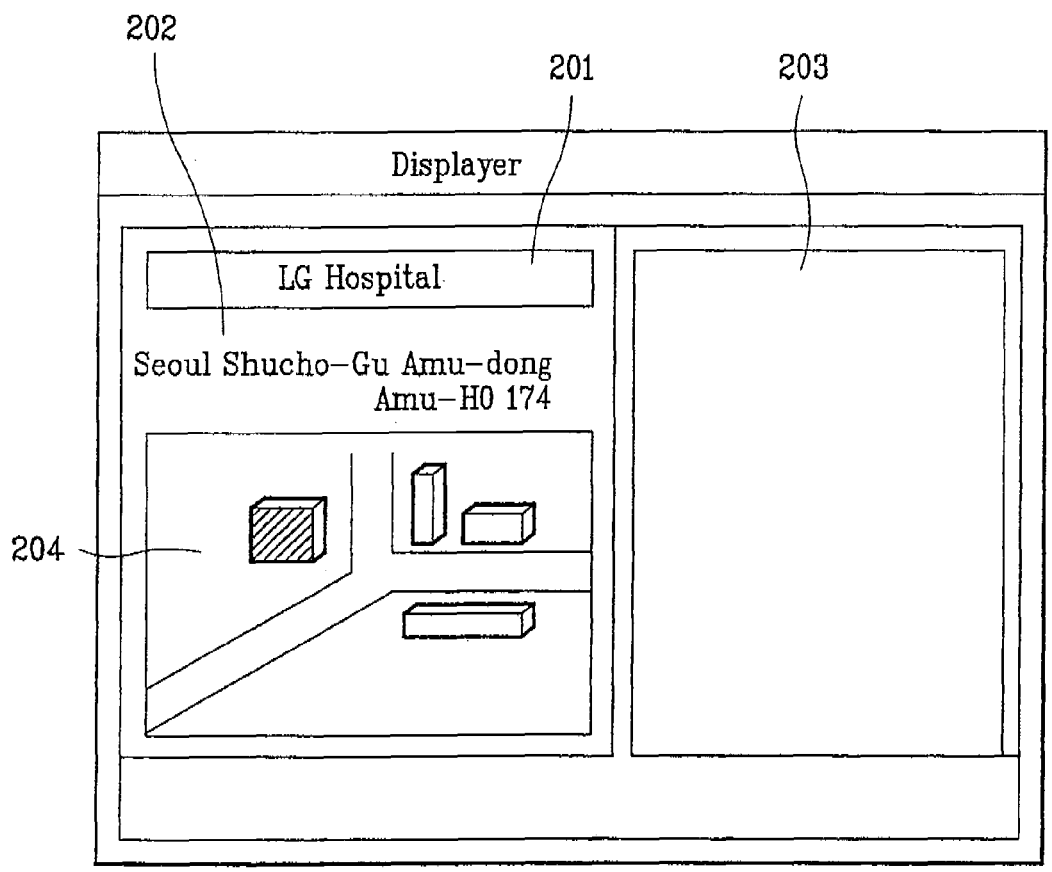
FIG. 2 illustrates a state of browsing of place information on a particular object when a moving picture is displayed in accordance with a preferred embodiment of the present invention.

Reference will now be made in detail to the preferred embodiments of the present invention, examples of which are illustrated in the accompanying drawings. A transmission side, such as a VOD system or a digital TV broadcasting station transmits a particular video signal to a display in a receiver side according to a request from a user. In this instance, the video signal is transmitted, together with coded multiple information having detailed supplementary information on each object included in the video signal. Therefore, the display in the receiver side receives all the video signal and the detailed supplementary information from the transmission side, and displays the video signal only. FIG. 1 shows one scene of a drama with a hospital in a background. During watching a video program a receiver side display displays, the watcher may request for browsing detailed supplementary information on an object, such as the hospital by handling a controller, such as a remote controller. The detailed supplementary information may be program content based information of which video signal is provided, or actual information. If the watcher in the receiver side requests for browsing of actual information on the hospital shown in FIG. 1, the receiver side browsers and displays a name 201, an address 202, and description of the hospital 203, and a sketch map 204 of the actual hospital as shown in FIG. 2. On the other hand, the watcher may request for browsing of content information on the hospital in the picture in FIG. 1 for better understanding of the story of the video program. In this instance, the receiver side display may browse and display the detailed information on the content basis hospital according to such a users request. In FIG. 2, if a network environment is supported for the receiver side display such that the receiver side display can be connected to the internet, the present frame on the display may be linked, and shift to an internet address (URL) where there is more detailed information on the place. In FIGS. 1 and 2, though the user requests for browsing content based information or actual information on a place, like the hospital, by handling the remote controller in the middle of watching the video program, the same method may be applicable to an object or an event. That is, actual information on a content based specific object in the moving picture program may be requested. The object may be extended even to an animal or virtual character in the moving picture program. For example, necessary detailed supplementary information on a performer the user likes, among performers in a drama, such as information on a name, profile, a fan club, an internet home page address, and the like, may be requested.

Figure 3:
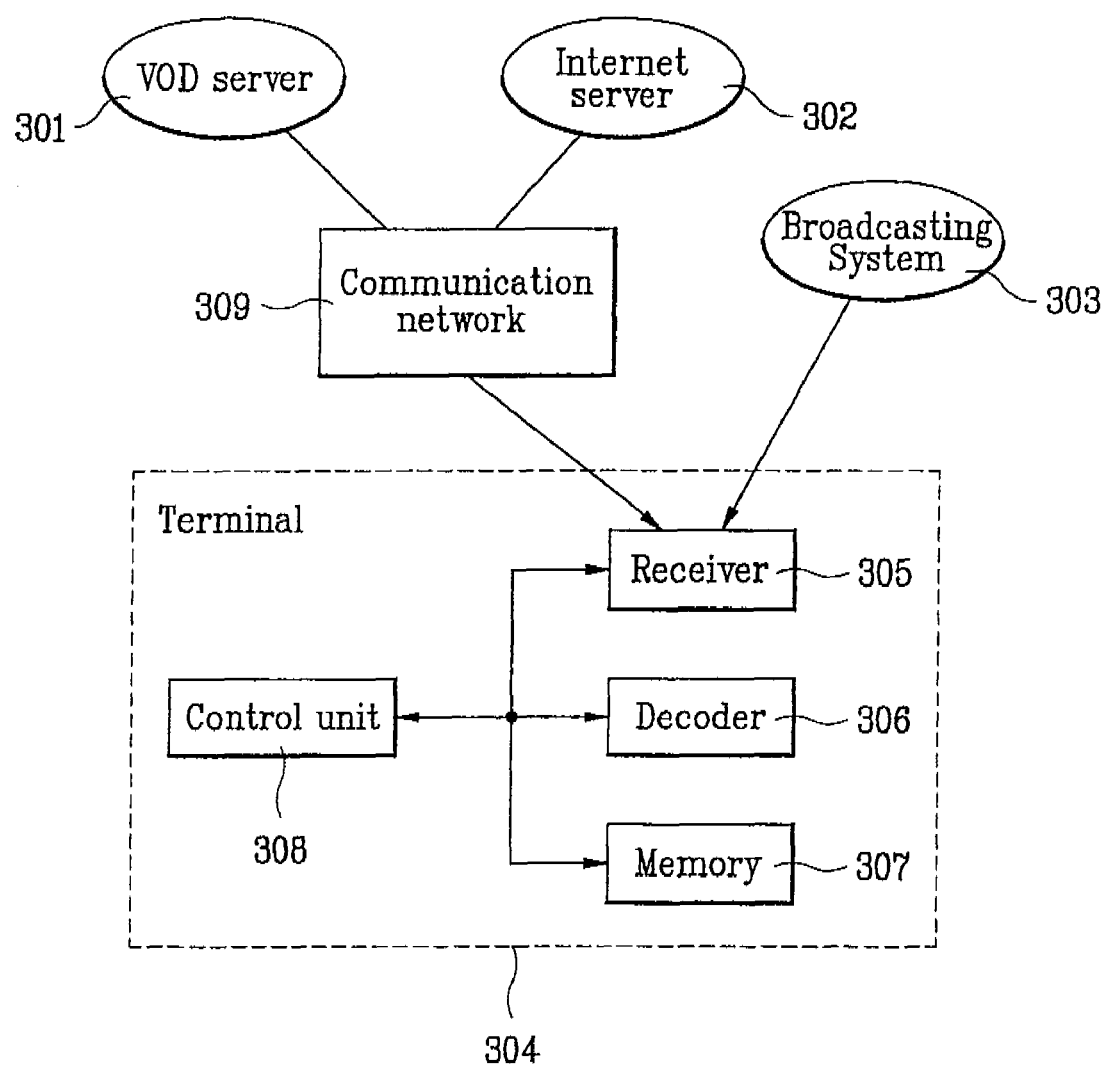
FIG. 3 illustrates a block diagram of a display for browsing a particular object in a moving picture in accordance with another preferred embodiment of the present invention.

FIG. 3 illustrates a block diagram of a display for browsing a particular object in a moving picture in accordance with another preferred embodiment of the present invention.

That is, FIG. 3 is an example for serving actual object related information as a coded data based on multiple information structure other than the moving picture, wherein the VOD server 301 and the internet server 302 shown in FIG. 3 are connected to a communication network 309, and the communication network 309 and a digital TV broadcasting system 303 are connected to a receiver 305 of the receiver side display 304. In FIG. 3, the receiver 305 in the receiver side display 304 receives a video signal from the communication network 309 or the broadcasting system 303, and a decoder 306 decodes the video signal, to separate an original moving picture data and a supplementary information data. Then, the separated original video data is displayed on the display directly, while the supplementary information data is stored in a memory 307, for using on request for browsing of content based supplementary information or actual supplementary information on a particular object in the moving picture. In FIG. 3, the control unit 308 controls browsing operation for the detailed supplementary information of the object in response to the request of the watcher. In this instance, if the receiver side display 304 is supported such that the receiver side display 304 is interlocked with a VOD system server or an internet server, the supplementary information of each object included in the video signal is not encoded with an original moving picture data, but is managed at the VOD server or the internet server separately, and provided at the watchers request. In the present invention, there is no special limitation on a position and a searching method of each object included in the video signal, and when and how the browsing is conducted. Therefore, as explained, the method for displaying the detailed supplementary information of each object included in the video signal will bring about a new advertising effect. For example, if a particular café, restaurant, or the like provides the detailed supplementary information on the café, restaurant, or the like as the café, restaurant, or the like support the place in production of the moving picture program, the watcher can obtain supplementary information (for example, place, address, description, and sketch map and etc.,) on the actual supported place in the moving picture when necessary.

Figure 4:
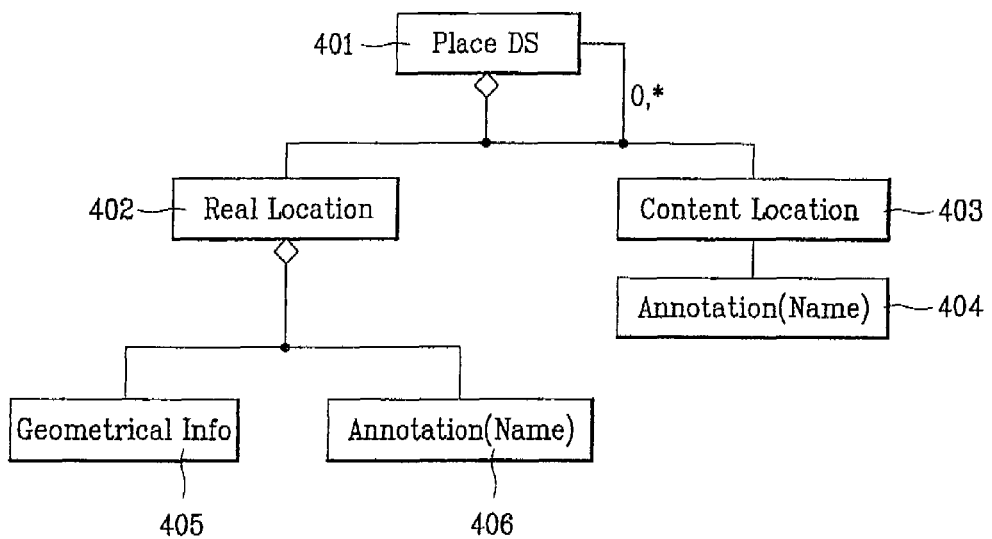
FIG. 4 illustrates a place DS of a particular object when a moving picture is displayed in accordance with a preferred embodiment of the present invention.

FIG. 4 illustrates a place DS of a particular object when a moving picture is displayed in accordance with a preferred embodiment of the present invention. Referring to FIG. 4, the place DS 401 of the present invention includes a real location 402 and a content location in a moving picture. The content location 403 includes an annotation 404, a description of a name, or location of the place in a form of a text. And, the real location 402 includes a geometrical info 405 and an annotation 406, a description of a name, or location of the real place in a form of a text. Therefore, the content location information is used for searching a moving picture by using object/place relation graph, and the real place information is used in providing information on the real place at users request.

Figure 5:
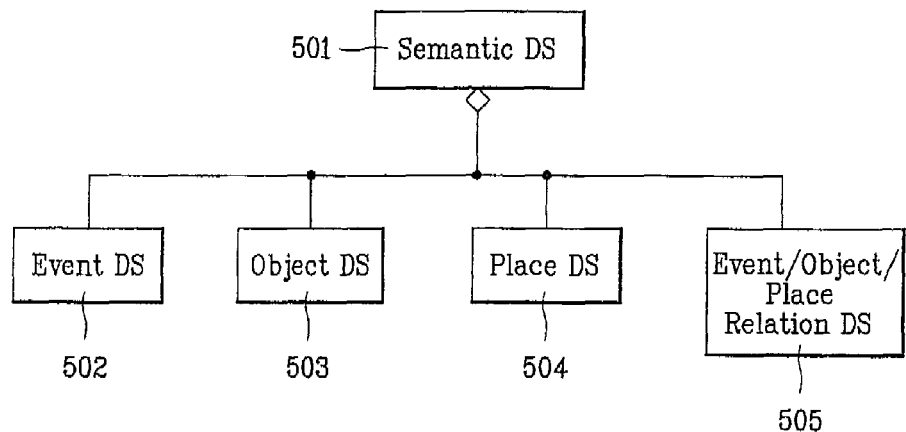
FIG. 5 illustrates a semantic DS showing relation with object/place included in a moving picture in a form of a graph in searching/browsing the moving picture in accordance with a preferred embodiment of the present invention.

FIG. 5 illustrates a semantic DS showing relation with object/place included in a moving picture in a form of a graph in searching/browsing the moving picture in accordance with a preferred embodiment of the present invention. Referring to FIG. 5, the semantic DS 501 of the present invention includes an event DS 502, an object DS 503, a place DS 504, an event/object/place relation DS 505 in which event/object/place relation are shown in a graph. The object DS, the place DS, and the event DS includes a text information for explaining the object, the place, and the event, respectively.

Figure 6:
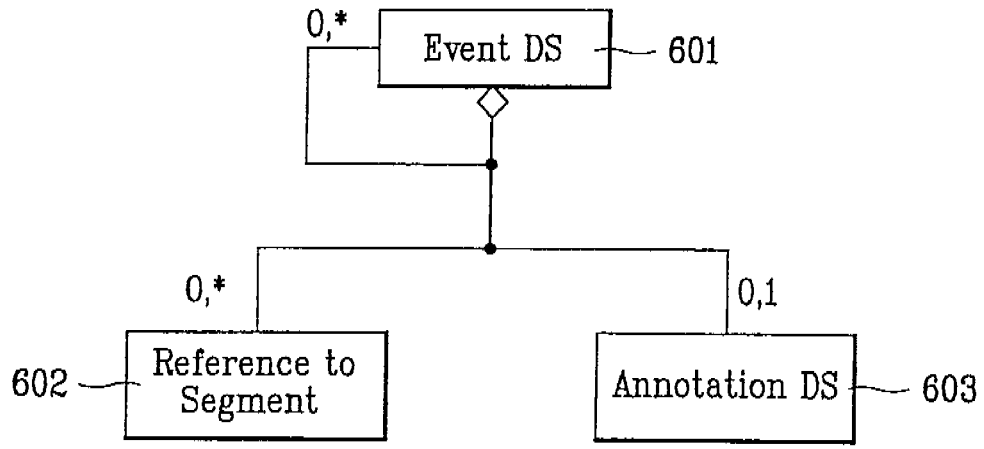
FIG. 6 illustrates a detail of the event DS in FIG. 5.

FIG. 6 illustrates a detail of the event DS in FIG. 5. Referring to FIG. 6, the event DS 601 of the present invention includes a reference to segment 602 and an annotation DS. Therefore, the receiver side display can display a relevant moving picture section by using such an event DS. That is, while text information explaining an event is provided, a moving picture section corresponding to the event is displayed by using the segment information. And, in FIG. 6, one event may include lower level event information explained in detail relatively. By using the event DS of such a hierarchical structure, object/place relation graph can be applied, not to an entire section of the moving picture, but to a portion of the section.

Figure 7:
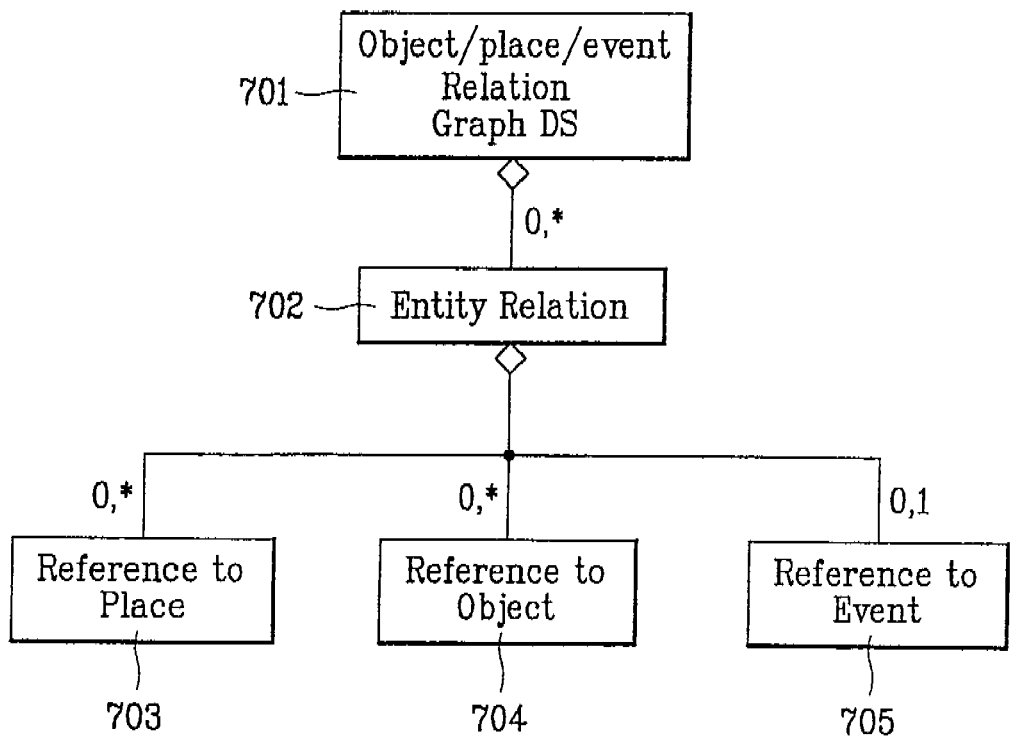
FIG. 7 illustrates a relation between object and place included in a moving picture in a form of object/place/event relation graph in displaying a moving picture in accordance with a preferred embodiment of the present invention.

FIG. 7 illustrates a relation between object and place included in a moving picture in a form of object/place/event relation graph in displaying a moving picture in accordance with a preferred embodiment of the present invention. Referring to FIG. 7, the object/place/event relation DS 701 of the present invention may be represented in an entity relation 702, inclusive of a reference to place 703, a reference to object 704, and a reference to event 705. In the object/place relation, one or more events may be related to one another, or only object and event are related, or place and event are related.

Figure 8:
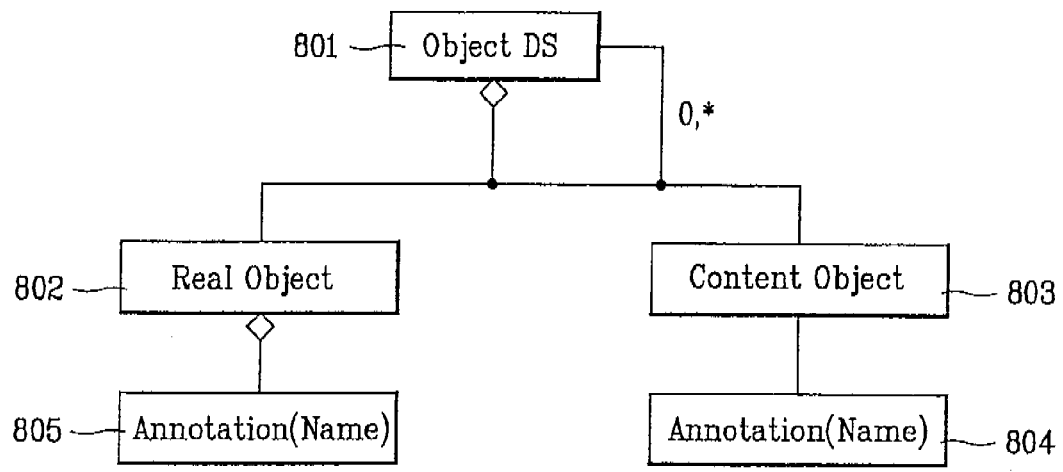
FIG. 8 illustrates multiple object DS included in a moving picture in accordance with a preferred embodiment of the present invention.

FIG. 8 illustrates multiple object DS included in a moving picture in accordance with a preferred embodiment of the present invention. Referring to FIG. 8, the multiple object DS 801 of the present invention includes a real object 802 and a content object 803 in a moving picture. The content object 803 includes an annotation which explains an object name or other information in a form of text, and the real object 802 includes an annotation 805 which explains the real object in a form of text. Thus, the content object is used for understanding a content of the moving picture, such as a moving picture searching by using an object/place (event when extended) relation graph, and the real object information is used for browsing or searching for the real object at a users request.

Figure 9:
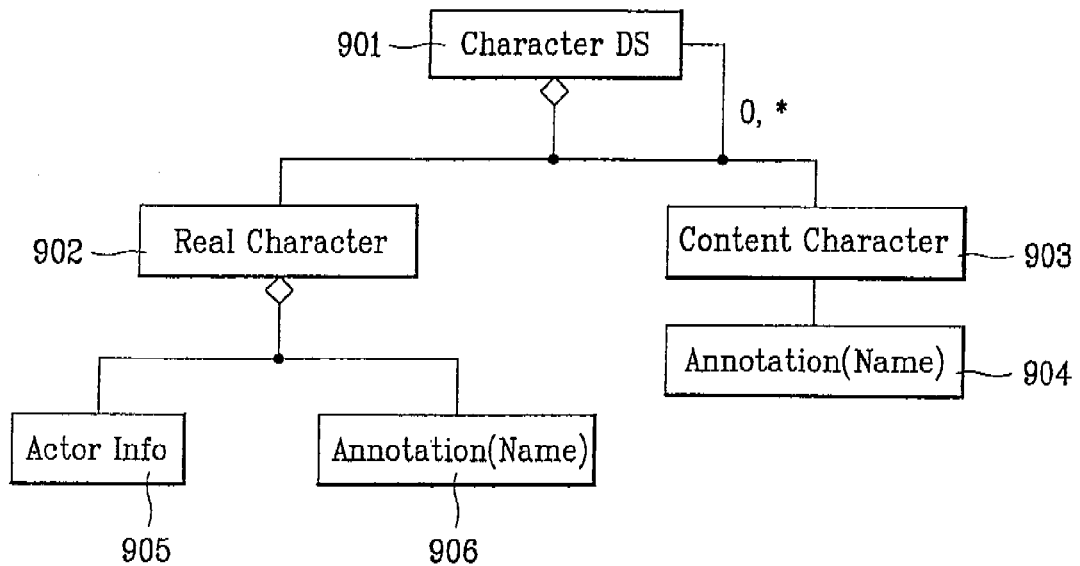
FIG. 9 illustrates an character DS in displaying a moving picture in accordance with a preferred embodiment of the present invention; and, FIG. 10 illustrates a state of browsing of a particular object included in a moving picture by using multiple object DS in accordance with a preferred embodiment of the present invention.

FIG. 9 illustrates a multiple object DS in FIG. 8 in accordance with another preferred embodiment of the present invention, showing a multiple character IDS. Referring to FIG. 9, the character DS 901 of the present invention includes a real character 902 and a content character 903. The content character 903 includes an annotation 904 which explains character information created according to name, character, and story development of the object in a content of the moving picture in a form of a text, and the real character 902 includes actor info of an actual particular object, and an annotation 906 explaining a name, a profile, the most important work and the like of the real character in a form of a text. The content character information is used for understanding a content of the moving picture, such as moving picture searching by using object/place relation graph, and real character is used in browsing/searching a real character (actor/actress) at users request.

Figure 10:
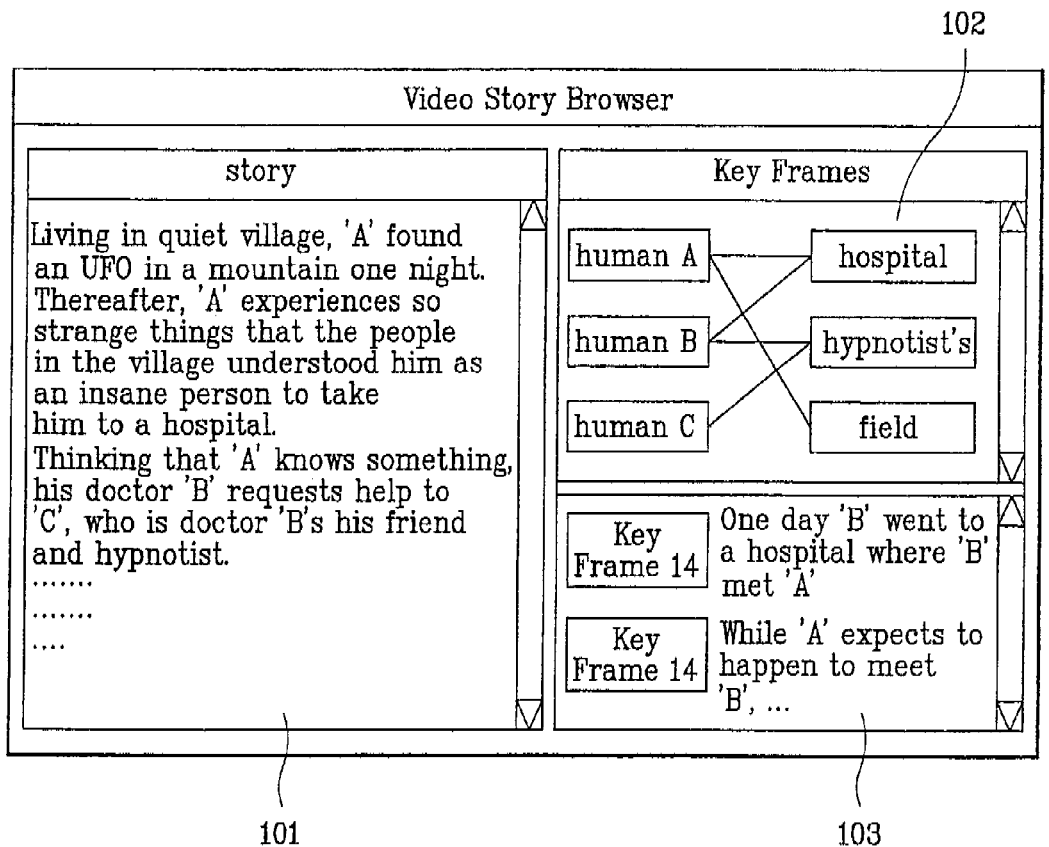

FIG. 10 illustrates a state of browsing of a particular object included in a moving picture by using multiple object DS in accordance with a preferred embodiment of the present invention. In FIG. 10, 101 expresses an outline of a video story by using the most schematic event structure, and 102 represents object-place relations set up within an event section selection in the outline 101. And, 103 explains detailed events meeting relations (human B-hospital) selected on the object-place relation graph 102.

Though multiple object DS of multiple character DS or multiple place DS is explained in the aforementioned embodiment of the present invention, multiple even DS can also be explained in the same method. For example, when contents of a moving picture is composed based on an actual event (or character), event information in a moving picture content and an actual event information may be provided on the same time.

As has been explained, because each object included in a video signal has content basis supplementary information on a moving picture and actual supplementary information on the same time when a moving picture signal is displayed on a display, the watcher may use the supplementary information in browsing/searching the moving picture for understanding content of the moving picture when necessary, as well as the actual supplementary information, thereby providing a new concept of advertising.

And, by providing object, place, and event structures, and a semantic structure representing relation between the structures, an moving picture browsing/searching can be made effectively based on the three elements when the moving picture is displayed. And, in order to carry out effective display of multimedia data of the present invention, particular object data structure is provided.

It will be apparent to those skilled in the art that various modifications and variations can be made in system, method, and multi-level object data structure thereof for browsing a multi-media data of the present invention without departing from the spirit or scope of the invention. Thus, it is intended that the present invention cover the modifications and variations of this invention provided they come within the scope of the appended claims and their equivalents.

What is claimed is:

1. A method implemented by an apparatus for using multimedia data, the apparatus including a processor, a storage device and a display, the method comprising:
storing, in the storage device, metadata describing at least a portion of a video program, the described portion of the video program including at least one segment depicting a first character played by a first actor, said metadata having a multi-level hierarchical structure and including character list data describing persons associated with said video program, wherein said character list data allows content referencing based on user input, and wherein the character list data includes a first character list item corresponding to the first character depicted in the video program, the first character list item including a character name to identify the first character and an actor name to identify the first actor playing the first character in the video program; and
using the processor in searching for said at least one segment depicting said first character based on said metadata to playback said at least one segment on the display.

2. The method of claim 1, further comprising:
receiving said at least one segment of the video program; and
playing back said received segment on the display.

3. The method of claim 2, wherein receiving said at least one segment of the video program includes receiving the entire video program from a digital broadcasting system.

4. The method of claim 1, wherein searching for said at least one segment depicting said first character based on said metadata includes using information in the first character list item.

5. The method of claim 1, wherein storing the metadata includes receiving the metadata from a digital broadcasting system.

6. The method of claim 1, wherein the first character list item is a container in the hierarchical structure and includes a character element and an actor element, the character element including the character name and the actor element including the actor name.

7. The method of claim 6, wherein the actor element further includes additional information about the first actor.

8. An apparatus for using multimedia data, the apparatus comprising:
a display;
a storage device; and
a processor configured to:
store, in the storage device, metadata describing at least a portion of a video program, the described portion of the video program including at least one segment depicting a first character played by a first actor, said metadata having a multi-level hierarchical structure and including character list data describing persons associated with said video program, wherein said character list data allows content referencing based on user input, and wherein the character list data includes a first character list item corresponding to the first character depicted in the video program, the first character list item including a character name to identify the first character and an actor name to identify the first actor playing the first character in the video program; and
search for said at least one segment depicting said first character based on said metadata to playback said at least one segment on the display.

9. The system of claim 8, wherein the processor is further configured to:
receive said at least one segment of the video program; and
play back said received segment on the display.

10. The system of claim 9, wherein receiving said at least one segment of the video program includes receiving the entire video program from a digital broadcasting system.

11. The system of claim 8, wherein searching for said at least one segment depicting said first character based on said metadata includes using information in the first character list item.

12. The system of claim 8, wherein storing the metadata includes receiving the metadata from a digital broadcasting system.

13. The system of claim 8, wherein the first character list item is a container in the hierarchical structure and includes a character element and an actor element, the character element including the character name and the actor element including the actor name.

14. The system of claim 13, wherein the actor element further includes additional information about the first actor.

* * * * *